Oct. 19, 1971  W. J. HOLM  3,613,187

CLOTH SHEAR WITH CHANGEABLE REST

Filed July 14, 1969

INVENTOR
WILLIAM J. HOLM

BY
Morse, Altman & Oates
ATTORNEYS

> United States Patent Office 3,613,187
Patented Oct. 19, 1971

3,613,187
CLOTH SHEAR WITH CHANGEABLE REST
William J. Holm, Springfield, Vt., assignor to Riggs & Lombard, Inc., Lowell, Mass.
Filed July 14, 1969, Ser. No. 841,201
Int. Cl. D06c *13/00*
U.S. Cl. 26—15 R    1 Claim

ABSTRACT OF THE DISCLOSURE

A machine for shearing a running fabric web is provided with a changeable rest mechanism by which any one of a plurality of different rests can be moved into operating position. A rotatable shaft carries a single edge hard rest and a multiple edge gap rest angularly spaced from one another and either of which may be rotated into position and locked.

BACKGROUND OF THE INVENTION

(1) Field of the invention

This invention relates generally to cloth shearing machines and more particularly is directed towards a cloth shear having multiple rests quickly changeable from one to another.

(2) History of the prior art

Cloth shearing machines are employed to trim fibers from the surface of a running fabric web. A hard single edge rest is used in shearing certain types of fabrics while a gap rest is used with other fabrics. Heretofore, a considerable amount of time and effort were required to change rests in a shearing machine since the installed rest had to be dismantled and the new one mounted and adjusted. It is an object of the present invention to provide improvements in cloth shearing machines and more particularly to provide a multiple rest cloth shearing machine in which a selected rest may be moved into operating position quickly and easily.

SUMMARY OF THE INVENTION

This invention features a cloth shearing machine having a plurality of different cloth rests a selected one of which may be moved into operating position by operating a single control. A rotatable shaft carries two or more angularly spaced rests, such as a single edge rest and a gap rest, which may be brought to bear by rotating the shaft into the correct position.

DETAILED DESCRIPTION OF THE PREFERRED EMBODIMENT

Figure 1:
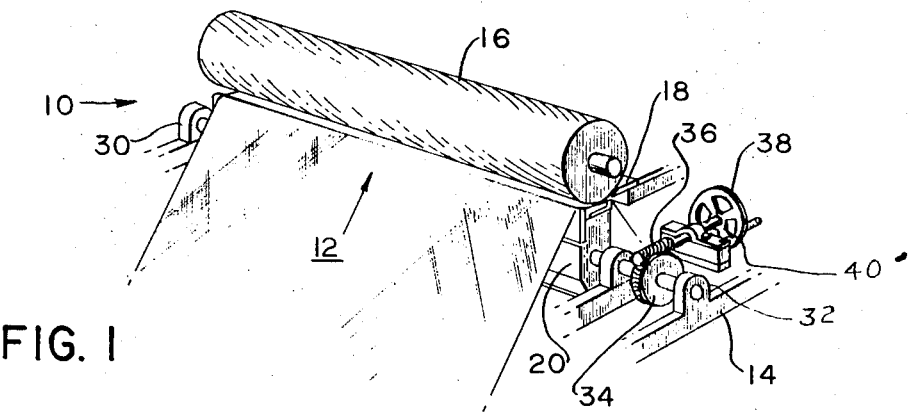
FIG. 1 is a view in perspective of a cloth shearing machine made according to the invention.

Referring now to the drawings, the reference character 10 generally indicates a cloth shearing machine adapted to shear fibers from the surface of a running cloth web 12. The shearing machine is generally organized about a frame 14 on which are mounted a shearing revolver 16, a ledger knife 18 and a cloth rest 20 over which the web 12 is carried in a flat open condition.

The revolver 16 typically is provided with a plurality of helical blades which co-act with the ledger knife 18 in shearing fibers from the web. The web 12 is advanced in a flat open width condition by draft rolls (not shown) up over the cloth rest 20 presenting fibers on the fabric surface to the revolver 16 and knife 18 for shearing action.

The rest 20, in the illustrated embodiment, is provided with two different types of rest elements permitting different types of materials to be passed through the shearing machine with a simple adjustment. As shown, the rest 20 is provided with a single edge hard rest 22 and a double edge gap rest 24 at opposite sides of a rotatable rest body 26. The rest body is fixed to a shaft 28 rotatably mounted to the frame 14 by bearings 30 and 32. One end of the shaft 28 is keyed to a pinion 34 in mesh with a worm gear 36 which is operated as by a hand crank 38 whereby the rest 20 may be rotated 180° from one operating position to another.

Figure 2:
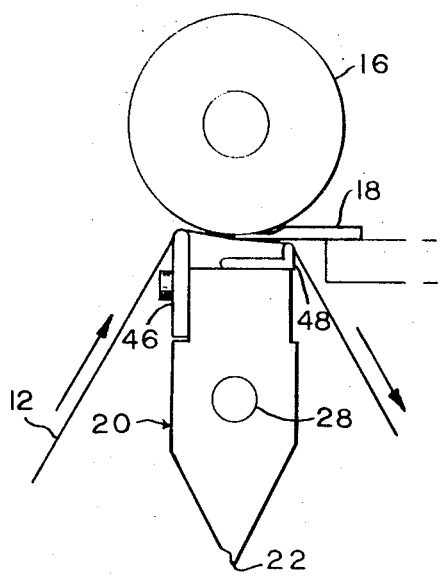
FIG. 2 is a sectional view in end elevation of the machine in the gap rest mode.
Figure 3:
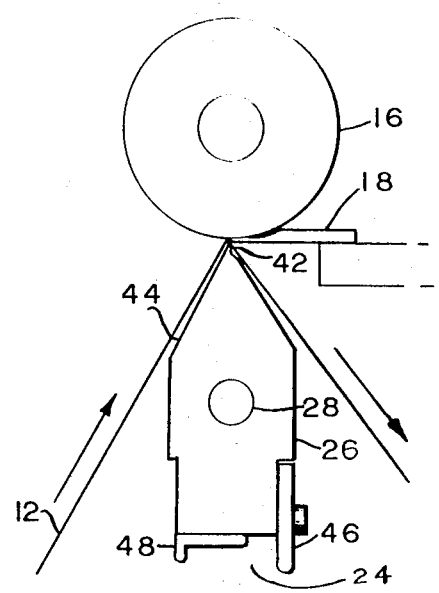
FIG. 3 is a view similar to FIG. 2 in the single edge rest mode, and, FIG. 4 is a front elevation of the changeable rest.
Figure 4:
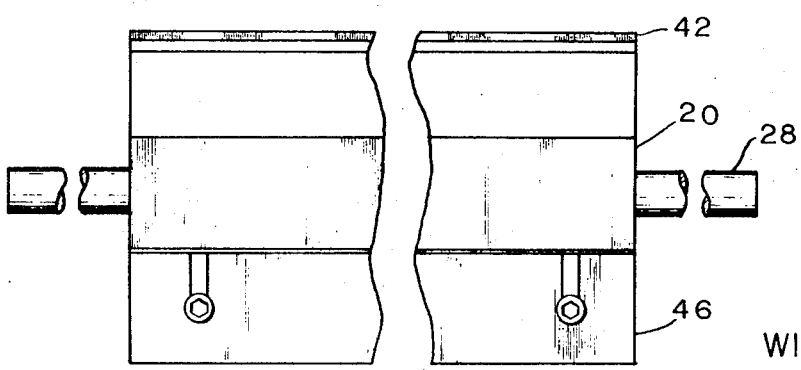

In FIGS. 1 and 2 the rest 20 is shown in the gap position whereas in FIG. 3 the rest is shown in the single edge position. The rest may be rotated 180° in either direction from one position to another or small angular adjustments may be made to obtain optimum shearing action for a particular type of material by operating the crank 38. In practice, a suitable locking mechanism such as a clamp 40 may be employed to assist in holding the rest in its selected position.

The hard single edge rest portion 22 typically is formed with a nose portion 42 extending from a flat diagonal face over which the web 12 is carried to set the fibers in a line against the shearing elements. The hard single edge rest is used in shearing certain types of material wherein the upstanding fibers must be trimmed to a uniform height. The nose portion 42 may be formed with a radius or it may be sharp in accordance with the type of material being processed.

The gap rest portion 24 is comprised of a flat plate 46 and an L-shaped member 48 bolted to the side and end respectively of the rest body 26. The outer working edges of the members 46 and 48 are slightly rounded and are spaced from one another to define a gap spanned by the web 12 when the gap rest is in operating position as in FIG. 2. The flat plate 46 is mounted to the rest body for height adjustment so as to bring the cloth closer to or further from the cutting elements as desired. The L-shaped member 48 is movable to or away from the plate 46 so as to change the size of the gap selectively, again in accordance with the type of material being processed. As shown in FIG. 2 the cloth spans the working edges of the gap rest elements 46 and 48 so that the portion of the cloth over the gap is brought against the shearing elements 16 and 18 in a yielding manner. The gap rest is primarily employed in shearing material formed with slubs, knots, etc., and it permits the shearing element to clean the face of the cloth without cutting holes through the cloth for the reason that there is no hard edge to push the slub, knot, etc., into the knife.

When the type of material that is to be shorn is changed so that a different rest is required, it is a simple matter to unlock the rest body and rotate the proper rest into operating position. The adjustment is made in a matter of a few minutes and there is no disassembling or reassembling required. While the invention has been shown with a single edge hard rest and a gap rest on the rotatable rest body, other types of rests may also be employed in any selected combination. For example, two hard single edge rests, one having a sharp rest and the other having a radius, may be employed, or a patterned rest may be employed in conjunction with either single edge hard rest or a gap rest. While two types of rests are shown in a single rest body this number may be increased so that more than two types of rests may be available on a single changeable rest body. For example, three different rests, such as a gap rest, a single edge hard rest and a patterned

Having thus described the invention what I claim and desire to obtain by Letters Patent of the United States is:

1. A cloth shearing machine, comprising
   (a) a shearing element including a rotary shearing revolver and a cooperating fixed ledger knife tangential to said revolver extending transversely of a running cloth web,
   (b) a cloth rest mounted in closely spaced parallel relation to said elements for supporting said web in shearing position with respect to said elements,
   (c) said rest being formed with a plurality of different rest portions angularly spaced from one another,
   (d) said rest being rotatably mounted to said machine about an axis parallel to said elements whereby any one of said portions may be moved selectively into a cloth engaging position,
   (e) means drivingly connected to said rest for rotating said rest from one locked position to another, including a pinion gear connected to said rest, a worm gear in mesh with said pinion gear, and drive means to rotate said worm gear,
   (f) one of said rest portions being a gap rest and another of said rest portions being a hard rest,
   (g) said gap rest portion including a pair of cloth engaging members spaced from one another and adjustably mounted to said rest, one of said members being mounted to said rest for adjustment along a first path parallel to a direction radial of said rest and the other of said members being mounted to said rest for adjustment along a second path perpendicular to said first path,
   (h) said first member being a substantially flat and substantially rectangular plate disposed in a plane parallel to said first path and said second member being L-shaped in cross-section, one end of which is parallel to said plate and the other end is perpendicular thereto,
   (i) said second member when in operative position being located adjacent said ledger knife and formed of a height less than the height of first member to provide clearance between said revolver and said second member for the tangentially disposed knife extending into the gap between said members.

References Cited

UNITED STATES PATENTS

| 2,997 | 9/1818 | Bryent | 26—15 |
| 148,171 | 3/1874 | Brown | 26—15 |
| 609,166 | 8/1898 | Richardson | 26—15 FB |
| 2,362,770 | 11/1944 | Remington | 26—15 |
| 2,389,800 | 11/1945 | Marble | 26—15 |

FOREIGN PATENTS

| 42,873 | 3/1908 | Switzerland | 26—15 |

ROBERT R. MACKEY, Primary Examiner